May 9, 1950 L. A. WERNER 2,507,287
VENTILATOR DRIP SHIELD
Filed April 26, 1949
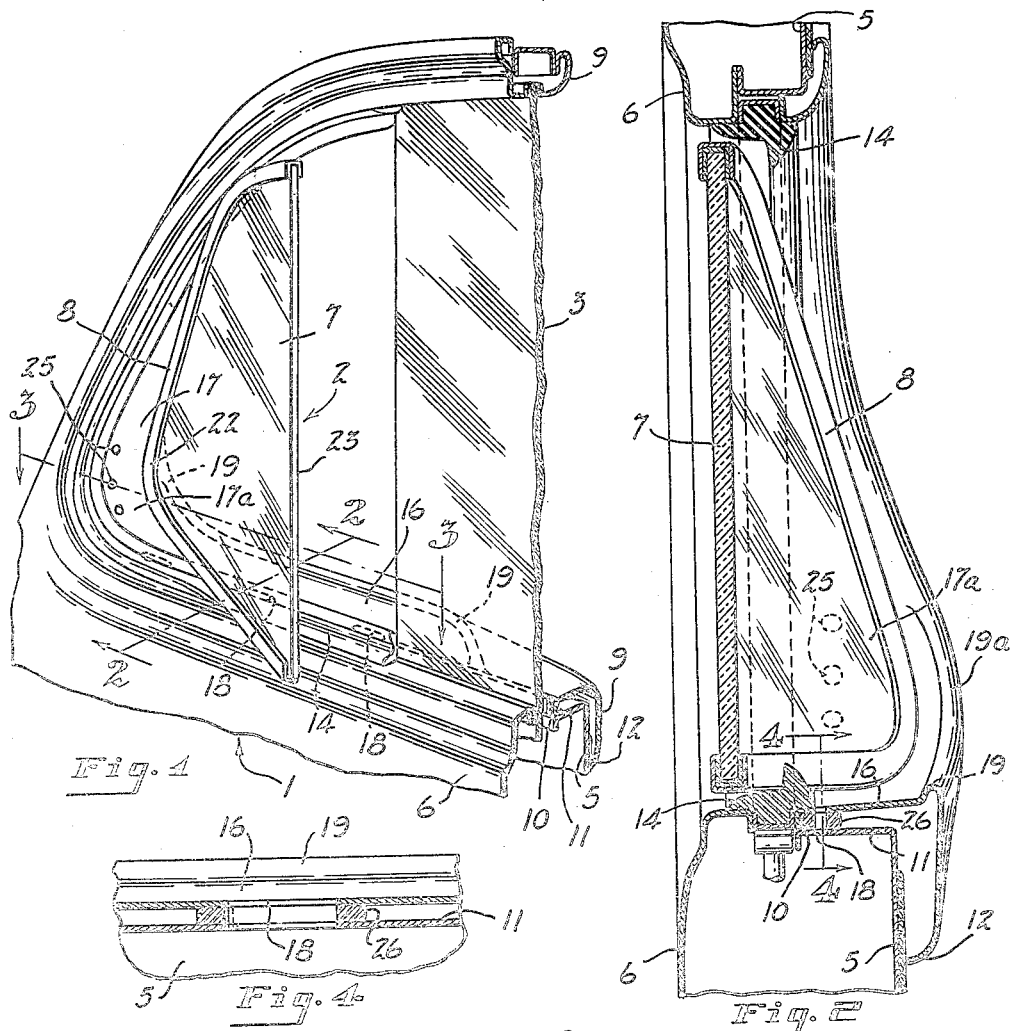
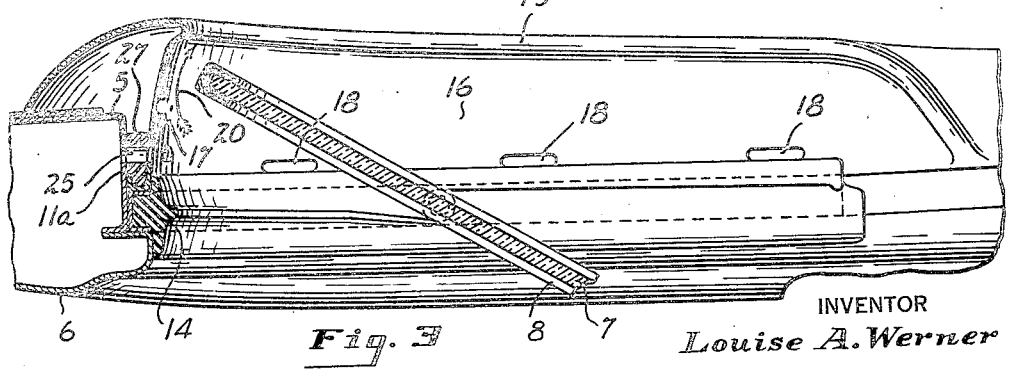
INVENTOR
Louise A. Werner
BY Evans & McCoy
ATTORNEYS

Patented May 9, 1950

2,507,287

UNITED STATES PATENT OFFICE 2,507,287

VENTILATOR DRIP SHIELD

Louise Amelia Werner, Cleveland, Ohio

Application April 26, 1949, Serial No. 89,647

7 Claims. (Cl. 296—44)

This invention relates to an improvement in windows of vehicles having one of the customary pivotal types of no-draft ventilators. It particularly relates to a method of separating and diverting rain water from the air stream entering the interior of moving vehicles through the no-draft ventilator before this water can run down over the legs of the operator or passengers, or before it can run down over the upholstery of the vehicles.

During a rain storm, particularly in the summer months, it has been the experience of occupants of moving automotive vehicles that the interior of the vehicle quickly becomes objectionable unless one or more of the no-draft ventilators are opened. When such ventilators are opened, even though opened only slightly, rain water is driven by the air currents into the interior of the vehicle so that it runs down the upholstery on the inside of the vehicle door or over portions of the occupants.

It is an object of the present invention to provide an improvement in vehicle windows, particularly windows in vehicle doors, comprising a conventional type of no-draft ventilator, which effectively prevents rain water from flying over occupants of the vehicle and from damaging upholstery and the like.

It is another object of the present invention to provide a method of separating and diverting rain water from the air stream entering a moving vehicle through a partly open no-draft ventilator before such rain water is permitted to contact the occupants or the upholstered portions of the vehicle.

Other objects will be apparent from the following description of the invention, in which:

Figure 1 is a perspective view of a portion of an automotive vehicle door embodying the present invention;

Figure 2 is an elevational view of a vertical plane passing through the lines 2—2 of Fig. 1 as seen from the direction of the arrows;

Figure 3 is a view as seen by looking in the direction of the arrows 3—3 from a horizontal plane through the line 3—3 of Fig. 1; and Figure 4 is a sectional view on the lines 4—4 of Fig. 2.

I have found that the rain water usually carried by air currents into the interior of the car through a partly opened no-draft ventilator may be readily and simply separated and diverted to eliminate its objectionable nature. This is accomplished by simply causing the air stream to impinge against an upstanding baffle surface to change its direction slightly and cause it to deposit its objectionable water on said surface, and by draining the deposited water to the interior of the door from which it passes in the same way as does rain striking the closed windowpane to the outside of the vehicle.

As may be seen from the drawing, I have illustrated the present invention by reference to the window in a rather conventional vehicle door 1 employing the no-draft ventilator having the pivotal window portion 2 which opens and closes by pivotal movement transverse to the general plane of the vehicle door, i. e. which may have conventional pivots at upper and lower intermediate portions to form a generally vertical axis for pivotal movement. When the pivotal window portion or windowpane 2 is opened, its lower forward or anterior portion 22 extends interiorly of the vehicle and its posterior portion 23 extends outside of the vehicle. The vehicle door may also contain the sliding glass portion 3 adapted to be lowered and raised as desired.

In the usual vehicle construction, spaced wall portions are provided and there is a drain to permit drainage of water to the outside from between these wall portions. Thus, the vehicle door comprises an inner door portion 5 and an outer door portion 6. These portions are adapted to be suitably fastened together to provide an opening or hollow space therebetween to receive the glass 3, the raising and lowering mechanism therefor, etc. The upholstery is fastened to the external surface of the inner door portion 5. Rain water striking the glass 3 runs downward along the glass into the interior of the door and out through suitable and conventional openings (not shown) provided at the bottom thereof so as to be emptied outside of the vehicle.

The pivotal no-draft ventilator or ventilating windowpane 2 generally comprises a glass portion 7 and a suitable frame 8, and it is suitably carried by a frame or trim portion 9 which is usually removably attached to the inner door portion 5. The frame 9 is generally angle-shaped to provide suitable locating flanges 10 and 12 around suitable portions of the periphery thereof. Flange 10 is adapted to bear against the outer surface of a suitable flange portion 11 of the inner door portion 5; and flange 12 is adapted to contact the upholstery and to bear against the outside surface of the inner door portion 5. The frame 9 generally carries a suitable sealing strip or gasket 14 of rubberlike material and that shaped in conventional manner to permit transverse movement of the ventilating portion of the door or window 2 and to provide an effective seal when the window is closed.

In accordance with the present invention, I provide a drip shield which comprises a trough or drain portion 16 and a generally upstanding baffle surface 17 to deflect the air stream and cause the water to be deposited thereon. The entire drip shield is conveniently and preferably formed as an integral portion of the window frame or trim 9. The trough portion 16 collects the water separated by the baffle surface 17 and it is provided with means, such as one or more openings 18 into the space between the inner and outer door portions, for draining the separated water to the exterior of the car in the same manner as does the water which contacts the interior surface of the window 3. The openings 18 may extend through the flange 11, the trough 16, and through a suitable gasket or tube 26 disposed between the trough and the flange 11 to make certain that water from the trough drains into the space between the inner and outer door members. The trough portion 16 is preferably provided with a dished or sloping surface, as shown, sloping downwardly from the inner peripheral lip portion 19 to cause all of the water collecting thereon to drain through the openings 18. The upstanding lip portion 19, which is preferably provided at the outer edges of the trough portion, may merge with a similar lip portion 19a at the inner edge of the separator portion or baffle surface 17 of the drip shield. The trough 16 may be of limited extent but ordinarily extends from the forward part of the no-draft opening, i. e. the base portion of the baffle surface, back toward the rear of the door to at least the pivot points of the no-draft opening. It preferably extends slightly beyond the junction of the no-draft ventilator with the window 3, as shown.

Separation of the rain water from the air stream is accomplished in accordance with the present invention by changing the direction of the air stream entering at the lower forward or anterior portion of the ventilator to sort of centrifugally throw out of said stream droplets of rain water before the air stream passes beyond the drip collector. The forward, upwardly extending portion 17 of the drip collector is therefore preferably suitably shaped to cause a change in direction in the air entering into the interior of the car as it passes along the outside surface of the partly opened no-draft ventilator into the space between the forward portion of the frame 9 and the forward portion of the ventilator and into the interior of the car. The change in direction is illustrated by the arrow 20 in Fig. 3. The baffle surface 17 (whose lower region is designated 17a) extends generally transversely to the closed window. It is spaced from the surface generated by movement of the forward edge of the pivotal window-pane 2 and particularly from the surface generated by the movement of the lower forward edge of the frame 8 to permit entrance of air when the windowpane 2 is only slightly pivoted from the closed position. Generally, the lower portion 17a of the upwardly extending baffle surface 17 of the separator is inversely or reversely curved or sloped back relatively to the initial direction of the air stream toward the rear portion of the door or window opening from adjacent the sealing strip 14 or the lower forward side edge of the closed pivotal window. However, a laterally extending baffle portion 17 of appreciable width from the closed window, which may not be sloped back or reversely curved, causes very appreciable change in the air stream. This is particularly the case when the baffle surface is provided with the upstanding lip portion 19a, as shown, which gives the general effect of reverse curvature.

Since most of the water entering the air stream is drainage from the ventilator 2, it is seen that the principal separation of water from the air stream occurs only in the lower upstanding regions 17a of the separator or baffle surface 17. It is therefore desirable that the width of the baffle surface transverse of the plane of the closed window be greater at the bottom than at the top or central region, and a gradual taper in width, increasing from top to bottom, is preferred, i. e. the distance between the inner edge portion 19 of the lower portion 17a of the baffle surface and the plane of the closed window should be the greatest in the region of the lower forward portion of the pivotal pane or ventilator, i. e. at the lower portion of the baffle surface 17 or its junction with the trough 16.

One or more relatively small openings 25 are preferably provided in the baffle through to the space between the body or door portions 5 and 6 in the general region where it joins with the trough 16 to form a passageway into the interior of the door. Such openings permit air to be forced into the door to carry by aspiratorlike action the impinging water into the interior portion of the door, from which it may be drained to the outside in usual manner. A gasket 27 may be provided between the flange portion 11a and the baffle 17 to prevent leakage therebetween.

The preferred drip shields of the present invention are integral with the window frame and have substantially greater protrusion transversely into the interior of the vehicle at the lower anterior or forward region of the pivotal window to provide greatest area for contact with the air stream at this point.

The drip shields of the present invention permit substantial opening of the no-draft ventilators in a moving vehicle in rainy weather without any objectionable water entering into the interior of the vehicle.

Although the invention may be employed in various ways, only preferred embodiments have been illustrated and described. Other embodiments may be made within the invention as provided by the patent statutes.

What I claim is:

1. In a vehicle window for a vehicle having spaced wall portions with a drain to the outside of said vehicle for water collecting between said spaced wall portions, which window comprises a no-draft ventilator having a windowpane pivotal about a generally vertical axis intermediate its ends from a closed position in the general plane of the entire window to an open position with the forward portion thereof extending into the vehicle and a posterior portion thereof extending outside the vehicle, the improvement which comprises a rigid drip shield attached to the lower window frame flange for the purpose of separating out water carried by the air stream entering a moving vehicle through said no-draft ventilator, said drip shield comprising a generally upstanding baffle surface, and means for draining water impinging on said baffle surface to the space between said spaced wall portions, said baffle surface being spaced from the surface generated by the lower forward edges of the pivotal window pane as it is moved from closed to open position and having contours cut by vertical planes through said window of a shape generally corresponding to the bottom and forward portion of said pivotal windowpane, said upstanding baffle surface extending upwardly along the window opening substantially to the upper pivot of the window pane and in a transverse direction inwardly of said vehicle from the region of the sealing edge of said pivotal windowpane when said pivotal windowpane is in the closed position to change the direction of the air stream entering into said vehicle and cause water carried along with it to strike said baffle surface, the inner edge of said baffle surface having a deflecting lip projecting rearwardly from said baffle surface.

2. In a vehicle window for a vehicle having spaced wall portions with a drain to the outside of said vehicle for water collecting between said spaced wall portions, which window comprises a no-draft ventilator having a windowpane pivotal about a generally vertical axis intermediate its ends from a closed position in the general plane of the entire window to an open position with the forward portion thereof extending into the vehicle and a posterior portion thereof extending outside the vehicle, the improvement which comprises a rigid drip shield attached to the lower window frame flange for the purpose of separating out water carried by the air stream entering a moving vehicle through said no-draft ventilator, said drip shield comprising a generally upstanding baffle surface portion extending upwardly along the window opening substantially to the upper pivot of the window pane and having a longitudinal contour of the general shape of the lower forward edge of said pivotal windowpane and a relatively horizontal collecting portion having a trough to collect water from said baffle surface portion, and means for draining water from said trough to the space between said spaced wall portions.

3. In a vehicle door having spaced inner and outer wall portions with a drain to the outside of said vehicle for water collecting between said spaced wall portions, a no-draft ventilating window portion pivotal about a generally vertical axis intermediate its ends from a closed position in the general plane of said vehicle door to an open position with the anterior portion extending into the vehicle, the improvement which comprises a rigid drip shield formed integrally with the lower window frame flange for the purpose of separating out water from the air stream entering a moving vehicle through said no-draft ventilating window portion, said drip shield comprising an upstanding baffle surface extending upwardly along the window opening substantially to the upper pivot of the window pane and extending from adjacent a forward side edge of said no-draft window portion in the generally lateral or transverse direction toward the interior of the vehicle, said surface being spaced from the surface generated by the forward edges of said no-draft ventilating window portion as it is moved from the closed to the open position but having the generally vertical contour of the lower forward portion of said surface, a generally horizontal trough for collecting water from said baffle surface, and means for draining said trough into the space between said spaced wall portions of said vehicle door.

4. In a vehicle window for a vehicle having spaced wall portions with a drain to the outside of said vehicle for water collecting between said spaced wall portions, which window comprises a no-draft ventilator having a windowpane pivotal about a generally vertical axis intermediate its ends from a closed position in the general plane of the entire window to an open position with the forward portion thereof extending into the vehicle and a posterior portion thereof extending outside the vehicle, the improvement which comprises a drip shield attached to the lower window frame flange for the purpose of separating out water carried by the air stream entering a moving vehicle through said no-draft ventilator, said drip shield comprising a generally upstanding baffle surface extending upwardly along the window opening substantially to the upper pivot of the window pane and having means for draining water impinging on said baffle surface to the space between said spaced wall portions, said baffle surface being spaced from the surface generated by the lower forward edges of the pivotal window pane as it is moved from closed to open position, said upstanding baffle surface extending in a transverse direction inwardly of said vehicle from the region of the sealing edge of said pivotal windowpane when said pivotal windowpane is in the closed position to change the direction of the air stream entering into said vehicle and cause water carried along with it to strike said baffle surface.

5. A vehicle door window according to claim 4 wherein the water-impinging baffle surface is generally sloped rearwardly of the vehicle to cause a change in the direction of air flow.

6. A vehicle door window of claim 4 wherein said baffle surface has an opening therethrough to drain into the interior of the vehicle door.

7. In a vehicle door having spaced inner and outer wall portions, a no-draft ventilating window portion pivotal about a generally vertical axis intermediate its ends from a closed position generally in the plane of the window to a position with the anterior portion extending into the vehicle, the improvement which comprises a rigid drip shield formed integrally with the window frame to separate water from the air stream entering a moving vehicle through said no-draft ventilator when in the open position, said drip shield comprising a generally upstanding separator portion extending along the window frame and a relatively horizontal dished collecting portion having an inner peripheral upstanding lip, the collecting portion of said drip shield being spaced from the surface generated by movement of the lower forward edge of the ventilating window to provide a space for air flow around said edge and extending along the window ledge with an opening in said collecting portion for draining water to the space between said spaced inner and outer wall portions.

LOUISE AMELIA WERNER.

REFERENCES CITED

The following references are of record in the file of this patent:

UNITED STATES PATENTS

| Number | Name | Date |
|---|---|---|
| 1,849,176 | De Fries | Mar. 15, 1932 |
| 2,060,109 | Parmenter | Nov. 10, 1936 |
| 2,390,260 | King | Oct. 4, 1945 |
| 2,465,345 | Elsebush | Mar. 29, 1949 |
| 2,486,408 | Holbrook | Nov. 1, 1949 |